(12) United States Patent
Joo et al.

(10) Patent No.: US 7,447,921 B2
(45) Date of Patent: *Nov. 4, 2008

(54) SCALABLE EXTENSIBLE NETWORK TEST ARCHITECTURE

(75) Inventors: Jeong Eun Joo, San Jose, CA (US); Fred King, San Jose, CA (US); Patrick Riley, Campbell, CA (US); Aart Konynenberg, Gilroy, CA (US); Paul Chang, Fremont, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 639 days.

This patent is subject to a terminal disclaimer.

(21) Appl. No.: 11/133,073

(22) Filed: May 18, 2005

(65) Prior Publication Data

US 2005/0232159 A1 Oct. 20, 2005

Related U.S. Application Data

(63) Continuation of application No. 10/328,469, filed on Dec. 24, 2002, now Pat. No. 6,898,720.

(51) Int. Cl.
*G06F 1/00* (2006.01)
*G06F 1/32* (2006.01)

(52) U.S. Cl. .................................... 713/300; 713/320

(58) Field of Classification Search ................ 713/300, 713/320
See application file for complete search history.

(56) References Cited

U.S. PATENT DOCUMENTS

| | | | |
|---|---|---|---|
| 5,148,389 A | 9/1992 | Hughes | |
| 5,428,806 A | 6/1995 | Pocrass | |
| 5,498,886 A | 3/1996 | Hsu et al. | |
| 5,550,885 A | 8/1996 | Nam et al. | |
| 5,987,614 A | 11/1999 | Mitchell et al. | |
| 6,453,014 B1 * | 9/2002 | Jacobson et al. | 379/26.01 |
| 6,490,277 B1 * | 12/2002 | Tzotzkov | 370/360 |
| 6,552,948 B2 | 4/2003 | Woo et al. | |
| 6,594,350 B2 | 7/2003 | Tang | |
| 6,657,966 B1 * | 12/2003 | Kramarczyk et al. | 370/241 |
| 6,898,720 B2 * | 5/2005 | Joo et al. | 713/320 |

OTHER PUBLICATIONS

"Victoria Combo SDH and Sonet, Tailored Test solution for the NGN" Trend Communications 10 pages.
"Victoria Combo 10G Module", Technical Data, Trend Communications, 3 pages.

* cited by examiner

*Primary Examiner*—Thomas Lee
*Assistant Examiner*—Ji H Bae
(74) *Attorney, Agent, or Firm*—Mikio Ishimaru

(57) ABSTRACT

A network test architecture includes a plurality of modules for performing a plurality of functions, each of the plurality of modules having a unique identifier. An additional module for performing an additional function has an additional unique identifier. A control bus is connected among the plurality of modules; a data bus is connected among the plurality of modules; and a power bus is connected among the plurality of modules. A controller controls operation, data transmission, and powering of the plurality of modules and the additional module, respectively, through the control bus, the data bus, and the power bus, the controller using the unique identifier and the additional unique identifier of the plurality of modules upon simultaneous connection of the control bus, the data bus, and the power bus to the additional module.

20 Claims, 15 Drawing Sheets

SCALABLE EXTENSIBLE NETWORK TEST ARCHITECTURE

CROSS-REFERENCE TO RELATED APLICATION(S)

This is a continuation of co-pending application Ser. No. 10/328,469 filed Dec. 24, 2002 which is hereby incorporated by reference herein.

TECHNICAL FIELD

The present disclosure relates generally to network test equipment and more particularly to network test architectures.

BACKGROUND ART

The proliferation of data and/or communication networks drives the development of equipment and procedures for characterizing, analyzing, and/or testing such networks and/or systems or devices coupled thereto. Over time, the development of new network technologies and/or enhanced versions of existing network technologies gives rise to new network capabilities and/or increased network performance. As a result, equipment and/or procedures for characterizing, analyzing, and/or testing networks must evolve accordingly.

To accommodate technological evolution in a manner that increases product lifetime and reduces product development and manufacturing costs, network test equipment may exhibit a modular design. In particular, a variety of field deployable network test devices is modular in nature. For example, a modular test instrument would include a base unit that coupled to a single removable application module. Any given application module may be directed toward performing particular types of network test operations, and application modules may be interchanged as network test requirements vary. Unfortunately, because the base unit couples to only a single application module, this type of test instrument undesirably exhibits limited scalability, as well as limited ability to perform multiple types of network test operations simultaneously. Moreover, repeated swapping or exchange of application modules is inconvenient.

Other types of field deployable network test devices can accommodate multiple application modules simultaneously. However, the number of application modules is undesirably limited to a relatively small number, for example, four or seven, and thus such test equipment unfortunately exhibits limited scalability. A need exists for a highly scalable and extensible network test architecture.

Solutions to these problems have been long sought but prior developments have not taught or suggested any solutions and, thus, solutions to these problems have long eluded those skilled in the art.

DISCLOSURE OF THE INVENTION

The present invention provides a network test architecture including a plurality of modules that perform a plurality of functions. Each of the plurality of modules has a unique identifier. An additional module for performing an additional function has an additional unique identifier. A control bus is connected among the plurality of modules; a data bus is connected among the plurality of modules; and a power bus is connected among the plurality of modules. A controller controls operation, data transmission, and powering of the plurality of modules and the additional module, respectively, through the control bus, the data bus, and the power bus using the unique identifier and the additional unique identifier of the plurality of modules upon simultaneous connection of the control bus, the data bus, and the power bus to the additional module.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

The present invention comprises a network test architecture that is scalable and/or extensible. The scalability provided by the present invention may flexibly accommodate a wide variety of network test requirements across multiple network test environments. Such scalability may facilitate the definition and/or design of multiple types of network test platforms, where any given platform may be suited or generally suited to a particular network test environment. The extensibility provided by the present invention may flexibly accommodate technological evolution of network technologies in an efficient, cost effective, platform independent manner.

Architecture Details

Figure 1:
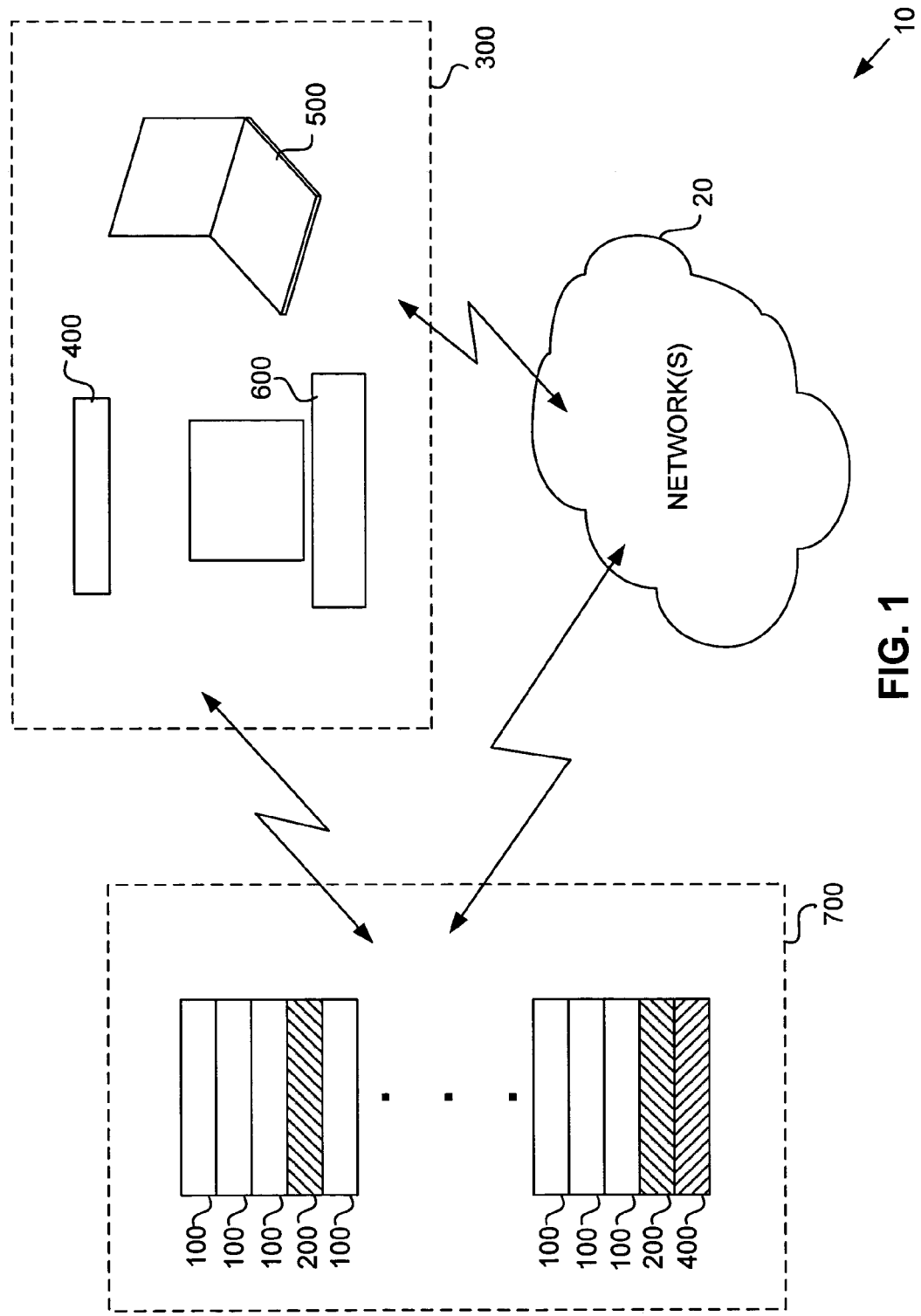
FIG. 1 is a block diagram of a scalable and extensible network test architecture according to an embodiment of the invention.

FIG. 1 is a block diagram of a scalable and extensible network test architecture 10 according to an embodiment of the invention. In one embodiment, the scalable extensible network test architecture 10 comprises one or more test modules 100, possibly one or more power modules 200, and at least one type of controller 300. The test modules 100 may be configured to communicate with a controller 300, and may be configured to communicate selectively with one or more networks 20. A controller 300 may also be configured for network communication. Test modules 100 may additionally be configured to communicate selectively with each other. The test modules 100, at least one power module 200, and possibly a control module 400, may form one or more portions of a test stack 700, as further described below.

In the context of the present invention, any given network 20 may be of essentially any type, and may operate in accordance with essentially any suitable type of signaling and/or information transfer protocol or protocol suite. A network 20 may carry or exchange one or more types of analog and/or digital information, which may include data, audio, visual, multimedia, and/or other types of signals. A network 20 may be implemented using wire-based, wireless, satellite, optical, and/or other technologies. A network 20 may be public, private, or virtual, and may comprise or span portions of a Local Area Network (LAN), a Metropolitan Area Network (MAN), a Wide Area Network (WAN), the Internet, an Intranet, a cable television (CATV) network, one or more portions of the Public Switched Telephone Network (PSTN), and/or other types of networks or communication infrastructures.

Test Modules

In one embodiment, a test module 100 may comprise hardware, software, and/or programmable media configured to test, characterize, analyze, diagnose, troubleshoot, verify, supervise, monitor, and/or simulate particular types of physical network and/or network signaling and/or protocol function or operation under the direction of a controller 300. A test module 100 may additionally or alternatively include hardware, software and/or programmable media configured to test, characterize, analyze, diagnose, troubleshoot, verify, supervise, monitor, and/or simulate various operations associated with one or more systems and/or devices associated with or included within a network 20, where such systems and/or devices may facilitate and/or provide various types of network services.

Figure 2A:
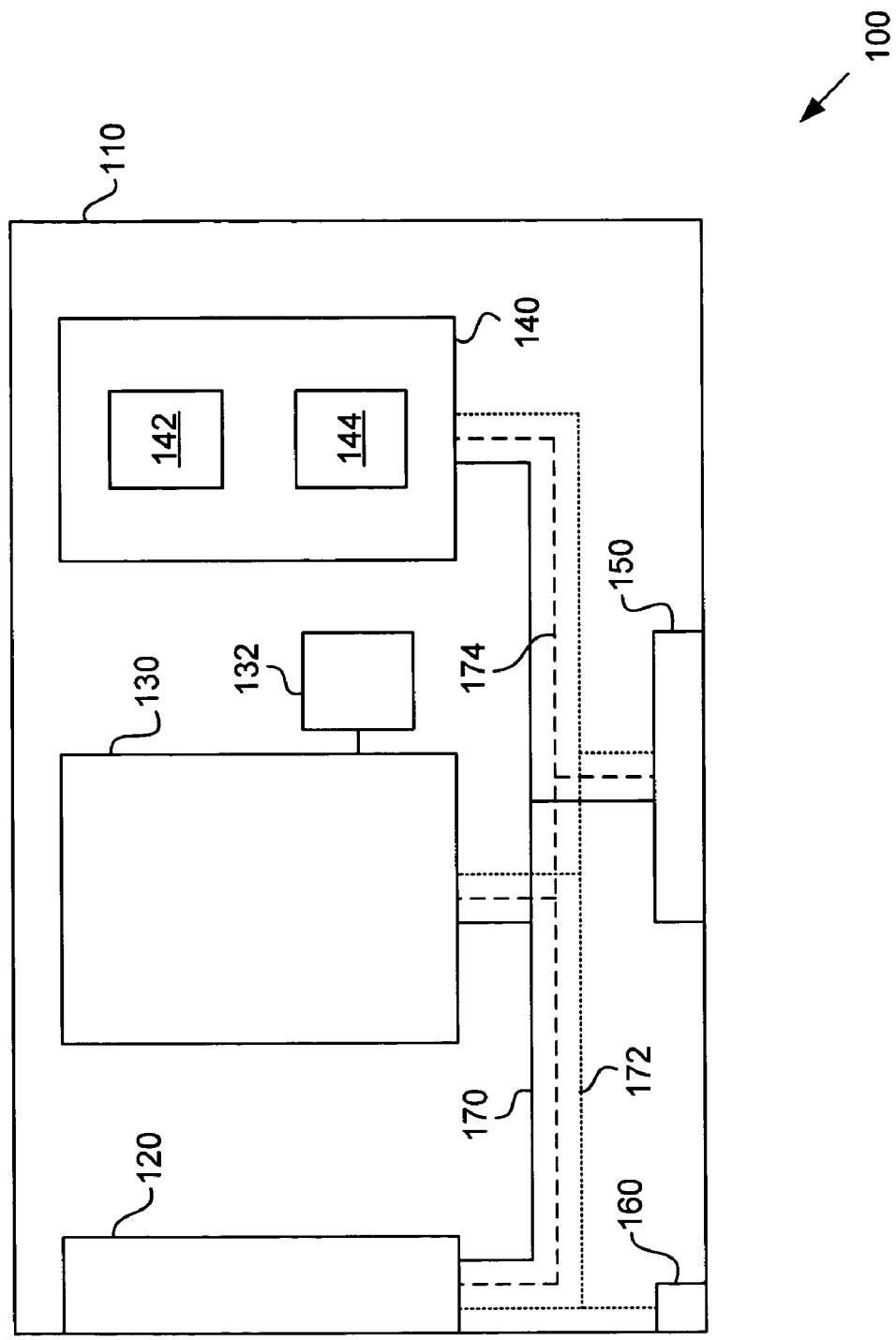
FIG. 2A is a block diagram of a test module according to an embodiment of the invention.

FIG. 2A is a block diagram of a test module 100 according to an embodiment of the invention. In one embodiment, the test module 100 comprises a case or shell 110 that may carry, contain, enclose, and/or include a communication unit 120, a test element unit 130, a memory 140, a control and power bus interface 150, and an adjunct power interface 160. A control bus 170 may be coupled to exchange control, initialization, data, and/or other types of signals between the communication unit 120, the test element unit 130, the memory 140, and/or the control and power bus interface 150. A power bus 172 may be coupled to deliver power from the control and power bus interface 150 and/or the adjunct power interface 160 to the communication unit 120, the test element unit 130, and the memory 140. A high-speed data bus 174 may be incorporated and coupled to carry test signals, exchange data, and/or communicate other types of signals between the communication unit 120, the test element unit 130, the memory 140, and/or the control and power bus interface 150.

In one embodiment, the test module's case 110 comprises metal, plastic, and/or one or more other types of material that are formed, machined, and/or molded to enclose one or more portions of the aforementioned elements. One or more portions of the case 110 may be reinforced or ruggedized in manners understood by those skilled in the art. One or more sides of the case 110 may include various types of indentations and/or other physical features to facilitate alignment and/or physical accommodation of other test modules 100 and possibly one or more power modules 200 and/or a controller 300 thereupon. Depending upon embodiment details, one or more sides of the case 110 may further include or incorporate one or more types of latching, locking, and/or securing devices and/or mechanisms to ensure secure or generally secure mounting of other test modules 100, possibly one or more power modules 200 and/or a controller 300 thereupon.

The communication unit 120 may comprise a set of network interfaces and/or input/output (I/O) interfaces and associated circuitry to facilitate and/or effect signal transfer or exchange between the test module 100 and one or more external networks 20 and/or devices. The communication unit 120 may include one or more of an Ethernet interface, a radio frequency (RF) communication interface, an infrared (IR) communication interface, a coaxial cable interface, an optical transceiver and/or optical fiber interface, a T-carrier and/or E-carrier interface, an RJ-45 interface, a parallel port, a serial port, a Universal Serial Bus (USB) interface, an IEEE 1394 ("Firewire") interface, a Personal Computer Memory Card International Association (PCMCIA) interface, 10BaseT, 10/100BaseT, 10/100/1000BaseT, RS-232, and/or other types of communication or I/O interfaces, ports, protocols, and/or elements.

In one embodiment, the test element unit 130 comprises hardware, software, and/or programmable media configured to test, characterize, analyze, diagnose, troubleshoot, verify, supervise, monitor, and/or simulate particular types of network, network signaling and/or protocol, network service, and/or network device functions or operations. The test element unit 130 will include appropriate electronic circuits for performing these functions, and may operate under the direction of or in response to commands received from a controller 300, or independently thereof. The test module 100 may include a unique MAC address 132 for supporting individual identification and control of each particular test module 100 by the controller 300. One or more portions of the test element unit 130 may execute program instructions or instruction sequences, which may reside within the test element unit 130 and/or the memory 140. Preferably, each test module 100 will have its own operating software, resident in the test element unit 130 and/or memory 140 for example, to enable the test module to perform testing independently of the controller 300.

The memory 140 may comprise one or more types of Random Access Memory (RAM), Read Only Memory (ROM), Programmable ROM (PROM), flash memory, and/or other types of data storage elements. One or more portions of the memory 140 may be removable. An operating system 142 and/or a set of test routines 144 may reside within the memory 140, where any given test routine 144 may comprise a sequence of instructions directed toward performing network, network signaling, network protocol, network device, and/or network service test, characterization, analysis, diagnosis, troubleshooting, verification, supervision, monitoring, and/or simulation operations.

Either independently, or in response to the controller 300, the test element unit 130 may execute one or more test routines 144 or portions thereof to perform a wide variety of network related test, characterization, analysis, diagnosis, troubleshooting, verification, supervision, monitoring, and/or simulation operations. Such operations may involve one or more PSTN, Digital Subscriber Line (DSL), T-carrier, E-carrier, Optical, mobile, Integrated Services Digital Network (ISDN), CATV, Internet, Intranet, Ethernet, SONET, SDH, and/or other types of networks or network segments, networking and/or internetworking protocols, one or more network switching technologies, network interface testing, data communication and/or signal transmission analysis, network provisioning functions, network signal type convergence testing, network performance and/or quality of service evaluation, network traffic monitoring and/or analysis, network activity and/or usage monitoring and/or analysis, and/or network time and/or service accounting.

Alternatively, if the services of a particular test module 100 are not needed at any given moment, the controller 300 can directly address that particular test module, by virtue of the module's unique MAC address, and instruct it to power off to save power. Later, when the test module may be required, it can similarly be uniquely addressed and instructed to power on. Power consumption can thereby be continually kept to the very minimum required.

The control and power bus interface 150 may comprise a set of lines and/or signal transfer pathways configured to facilitate a) the exchange of commands, configuration information, test routines, and/or data between the test module 100 and controller 300; and b) the distribution of power from the power module 200 to the test module 100. The control and power bus interface 150 may be structured and/or organized to couple the test module 100 to other test modules 100, a power module 200, and possibly a controller 300 in a space efficient manner, as described in detail hereinafter.

Figure 2B:
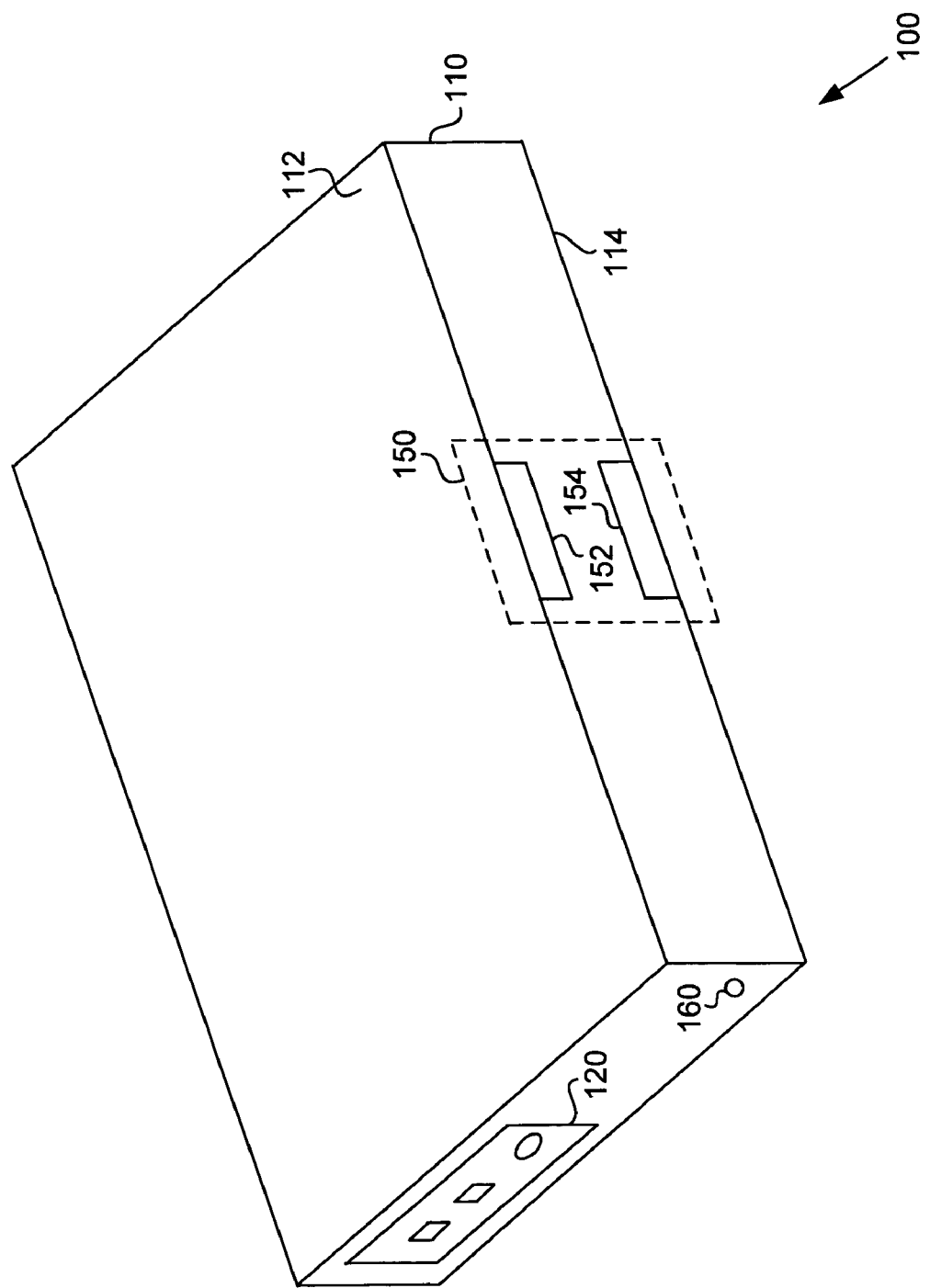
FIG. 2B is perspective view of a test module according to an embodiment of the invention.

FIG. 2B is a perspective view of a test module 100 according to an embodiment of the invention. Relative to FIG. 2A, like reference numbers may indicate like, analogous, and/or essentially analogous elements. The test module's case 110 may facilitate external access to a communication unit 120, a control and power bus interface 150, and an adjunct power interface 160 in a variety of manners. In one embodiment, the control and power bus interface 150 comprises a first control and power interface 152 positioned relative to a first side 112 of the case 110, and a second control and power interface 154 positioned relative to a second side 114 of the case. The first and/or second control and power interfaces 152, 154 may comprise sockets and/or receptacles that facilitate electrical coupling between the test module 100 and other test modules 100, a power module 200, and/or a controller 300 that are physically adjacent or proximate to the first and/or second sides 112, 114 of the case 110.

Figure 2C:
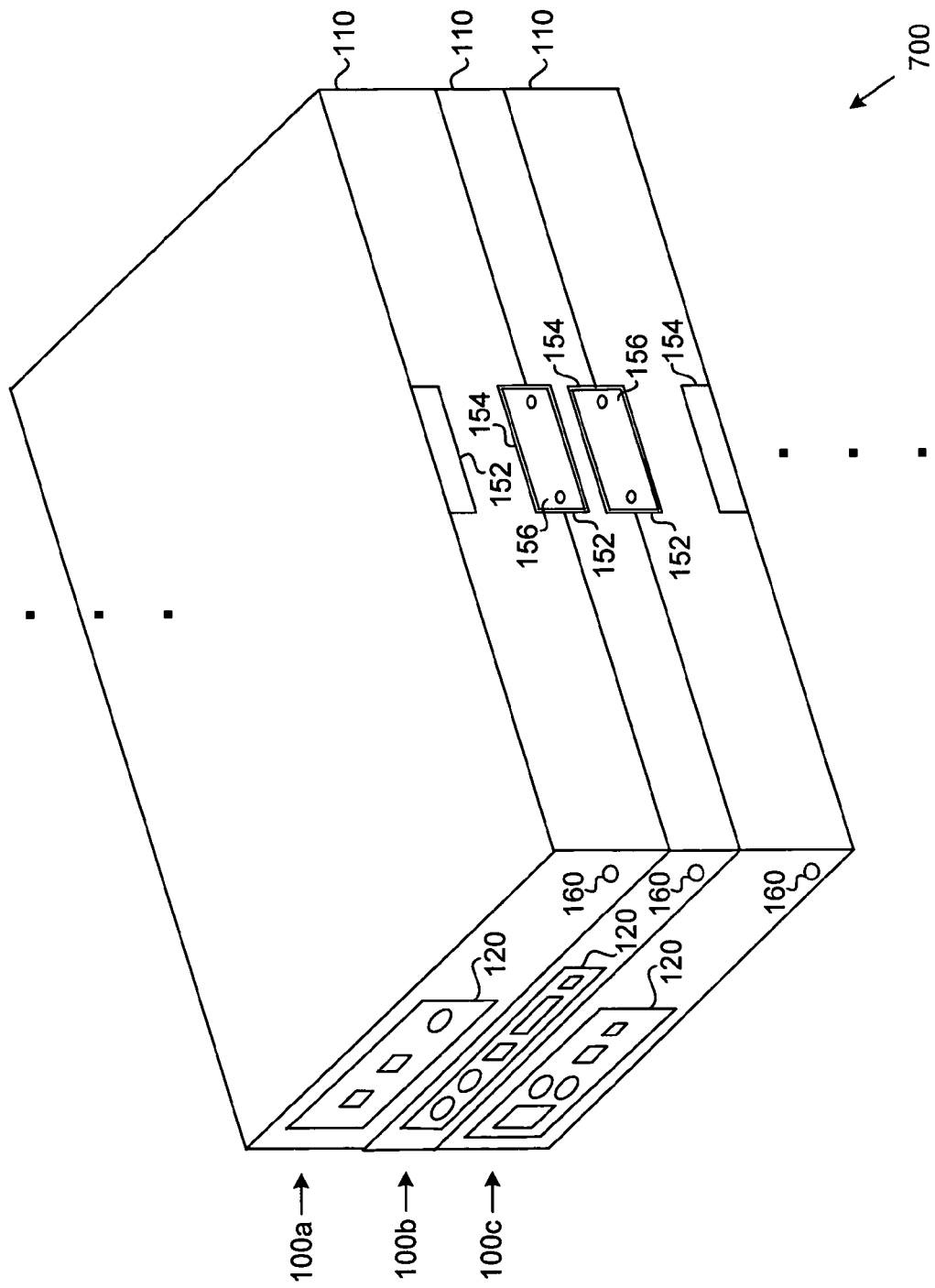
FIG. 2C is a perspective view of a first, a second, and a third test module coupled together according to an embodiment of the invention.

FIG. 2C is a perspective view of a first, a second, and a third test module 100a, 100b, 100c, respectively, coupled together according to an embodiment of the invention. Relative to FIG. 2A, like reference numbers may indicate like, analogous, and/or essentially analogous elements. A coupling member or insert 156 may couple any given test module's first control and power interface 152 to a physically adjacent test module's second control and power interface 154, and vice versa. The coupling insert 156 may comprise a disconnectable or removable plate or cover having wires and/or circuit elements therein and/or thereupon that facilitate or effect electrical path continuity between test modules 100a, 100b, 100c. The coupling insert 156 may include securing or fastening portions, devices, and/or mechanisms (e.g., screws and/or pins), and/or structural features such as indentations that facilitate ease of handling and which aid connection, disconnection, attachment, detachment and/or insertion and removal of the coupling insert 156. The coupling insert 156 may also conveniently be a part of or attached to a module.

Test modules 100a, 100b, 100c may be vertically or horizontally organized to form one or more portions of a test stack 700. As described in detail below, power modules 200 may also reside within and/or form one or more portions of a test stack 700. Depending upon embodiment details, a controller 300 may also form a portion of a test stack 700. Portions of a test stack 700 may be electrically coupled together using a set of coupling inserts 156, such that a common bus runs throughout or essentially throughout the test stack 700. The bus may carry control signals, power signals, and/or other types of signals or information.

Power Modules

Figure 3A:
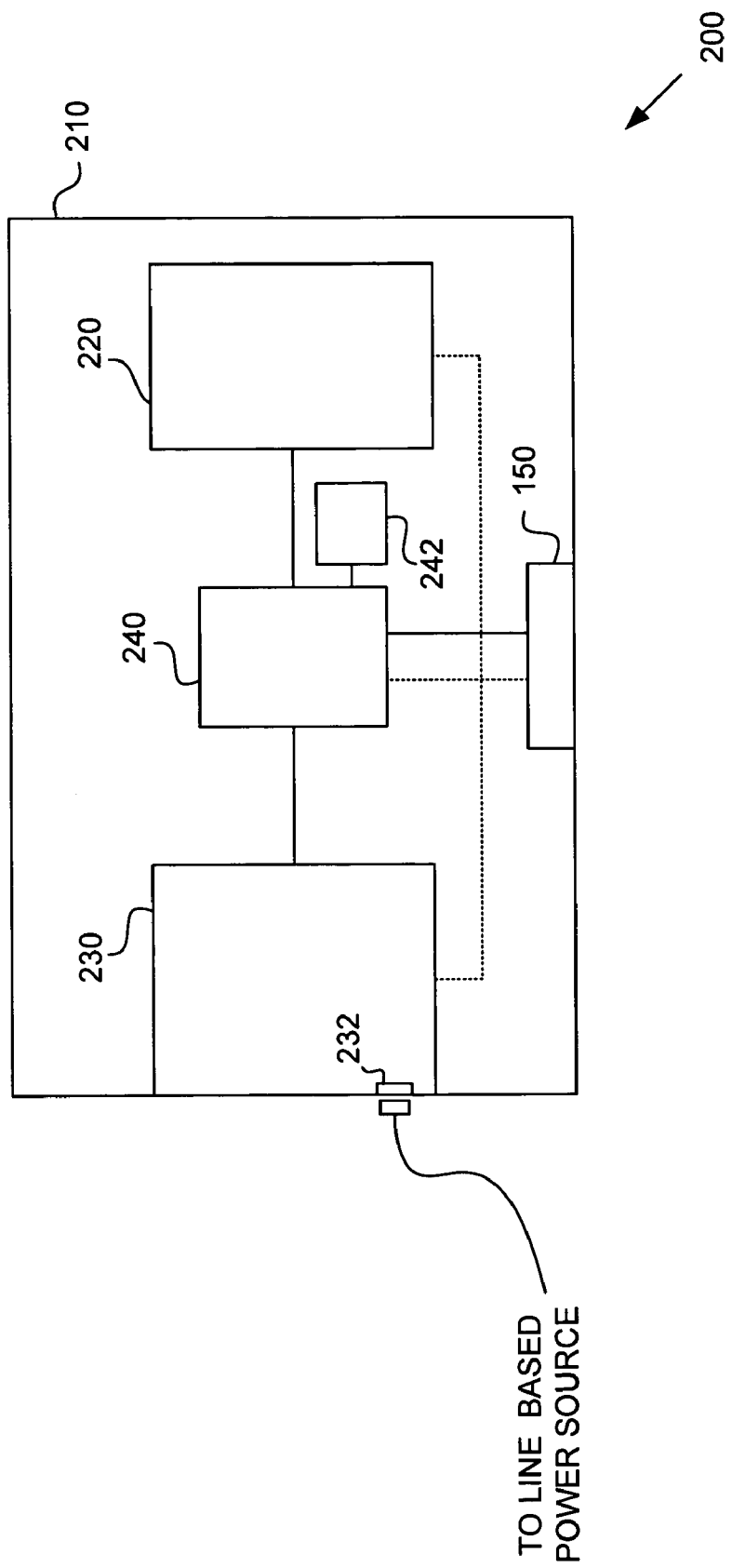
FIG. 3A is a block diagram of a power module according to an embodiment of the invention.

FIG. 3A is a block diagram of a power module 200 according to an embodiment of the invention. Relative to other Figures described herein, like reference numbers in FIG. 3A may indicate like, analogous, and/or essentially analogous elements. In one embodiment, the power module 200 comprises a case 210 that carries, contains, and/or incorporates a control and power bus interface 150, and at least one of a battery based or stored power unit 220 and a non-battery, non-stored, AC, or line based power unit 230. The line based power unit 230 may include a line interface 232 that facilitates coupling to a cord, cable, and/or link configured to deliver power from a line based power source. The power module 200 may further comprise a power management unit 240, and the power management unit 240 may have a unique MAC address 242 for supporting individual identification and control of each particular power module 200 by the controller 300.

The power module's case 210 may comprise materials, structures, and/or features that are identical, analogous, and/or essentially analogous to those described above relative to the test module's case 110. The control and power bus interface 150 may facilitate a) receipt of commands from a controller 300; and b) distribution of power from the battery based power unit 220 and/or the line based power unit 230 to test modules 100 and possibly a controller 300. The power management unit 240 may direct or manage the operation of the stored power unit 220 and/or the line based power unit 230, possibly facilitating or effectuating control of power delivery modes (e.g., on/off and/or sleep). Those skilled in the art will understand that one or more portions of the power module 200 may include power regulation and/or signal conditioning circuitry.

Figure 3B:
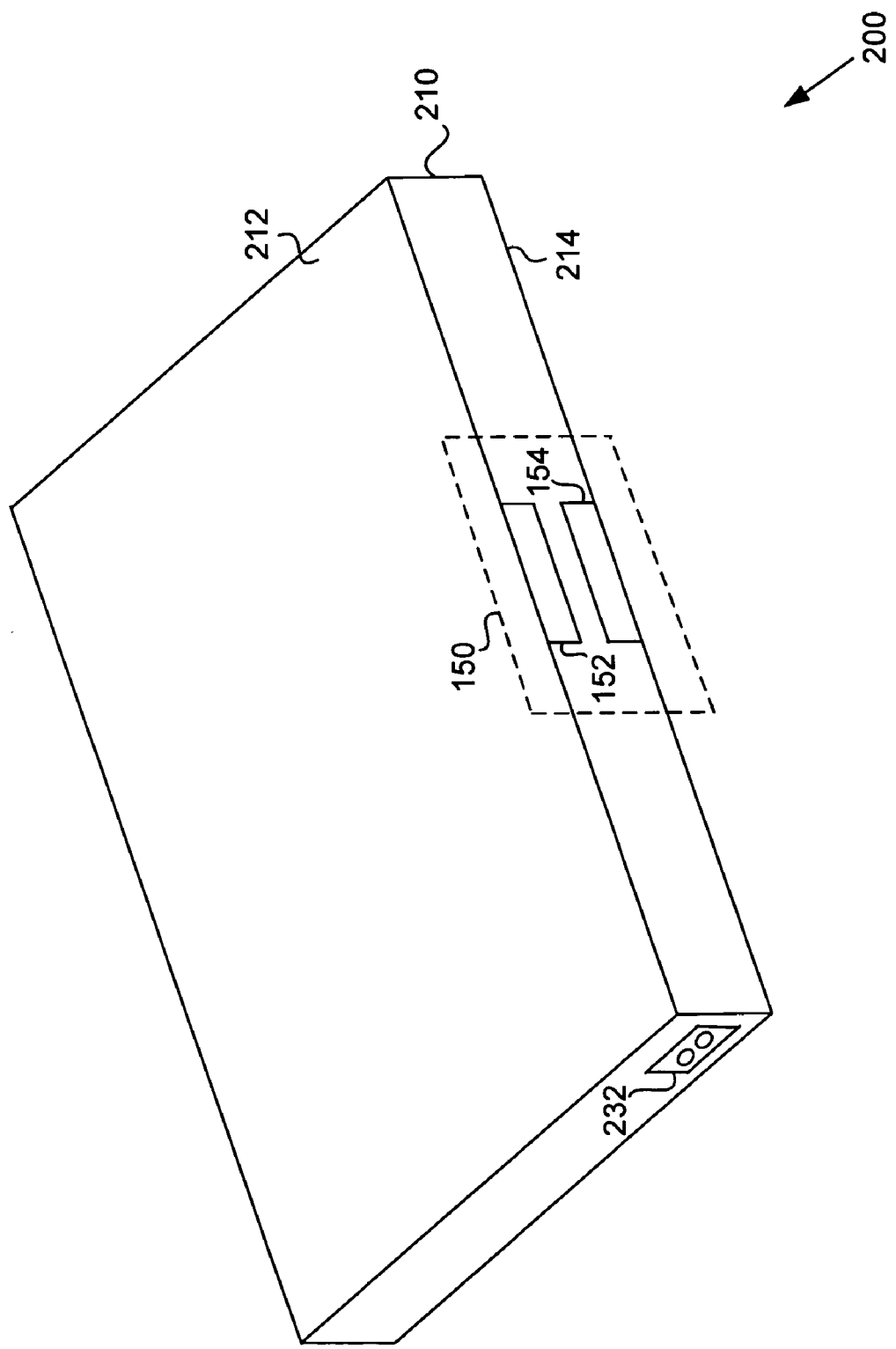
FIG. 3B is a perspective view of a power module according to an embodiment of the invention.

FIG. 3B is a perspective view of a power module 200 according to an embodiment of the invention. Relative to FIGS. 2B and 3A, like reference numbers indicate like, analogous, and/or essentially analogous elements. In one embodiment, the power module's control and power bus interface 150 comprises a first control and power interface 152 positioned relative to a first side 212 of the power module's case 210, and a second control and power interface 154 positioned relative to a second side 214 of the power module's case 210. The first and second control and power interfaces 152, 154 may facilitate delivery of power to test modules 100 or possibly a test module 100 and a controller 300 that reside upon or proximate to the first and second sides 212, 214 of the power module's case 210. A power module 200 of the type shown in FIG. 3B may reside at essentially any location within a test stack 700.

Figure 3C:
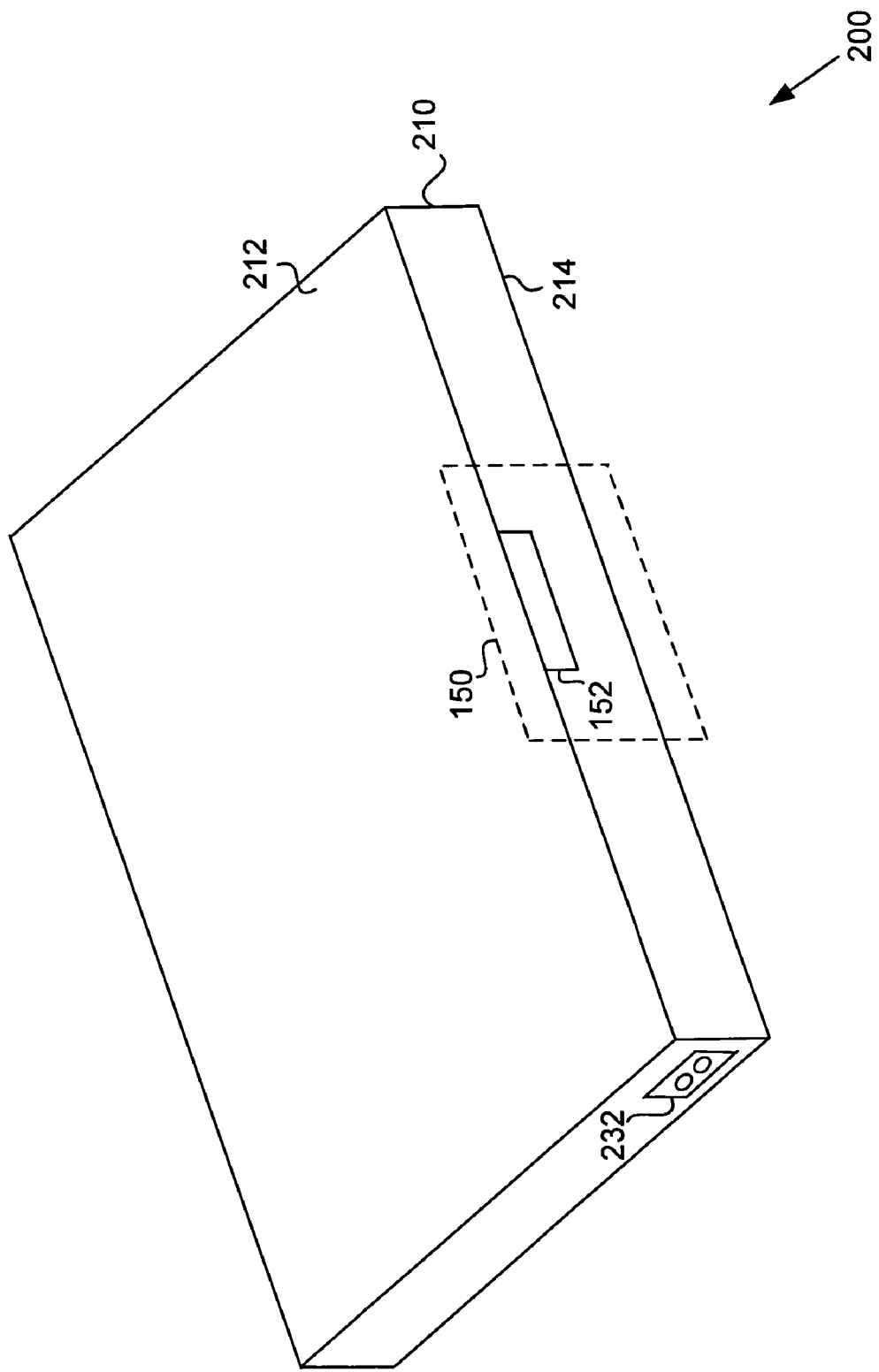
FIG. 3C is a perspective view of a power module according to another embodiment of the invention.

FIG. 3C is a perspective view of a power module 200 according to another embodiment of the invention. Relative to FIGS. 2B and 3A, like reference numbers indicate like, analogous, and/or essentially analogous elements. In the embodiment shown in FIG. 3C, the power module's control and power bus interface 150 may comprise a single control and power interface 152. In such an embodiment, the power module 200 may reside at one end of a test stack 700, and deliver power to test modules 100 and possibly a controller 300 extending away from the end of the test stack 700 at which the power module 200 resides. Depending upon embodiment details, a single test stack 700 may include both types of power modules 200 shown in FIGS. 3B and 3C.

Any given power module 200 may accommodate the power consumption requirements of a limited number of test modules 100. For example, a single power module 200 may be configured to supply battery based and/or stored power to six test modules 100 for a given time period. A power module 200 may additionally or alternatively be capable of supplying line-based power to the same or a larger number of test modules 100 essentially without time limitation.

A test stack 700 may incorporate a number of power modules 200 appropriate for supporting the power requirements of the test modules 100 and possibly a controller 300 within the test stack 700. For example, if any given power module 200 is rated or configured to support six test modules 100, a test stack 700 that includes one to six test modules 100, or one to five test modules 100 plus a controller 300, may include one power module 200. Similarly, a test stack that includes seven to twelve test modules 100, or six to eleven test modules 100 plus a controller 300, may include two power modules 200. Those skilled in the art will understand that a single power module 200 may support the power requirements of additional or fewer test modules 100 depending upon embodiment details.

Controllers

A controller 300 may direct or manage the operation of test modules 100 and/or power modules 200 within a test stack 700. A controller 300 may additionally analyze and/or display configuration information, status information, data signals, test results, and/or other information associated with and/or received from one or more portions of a test stack 700. A controller 300 may comprise one or more of a control module 400, a laptop computer 500, and/or a desktop computer or workstation 600. In one embodiment, a control module 400 may be designed to physically reside upon and couple to a test stack 700. That is, a control module 400 may form a portion of the test stack 700 itself. A desktop computer or workstation 600 may reside separately from a test stack 700, while maintaining wire based, wireless, optical, and/or other types of communicative couplings thereto.

Figure 4A:
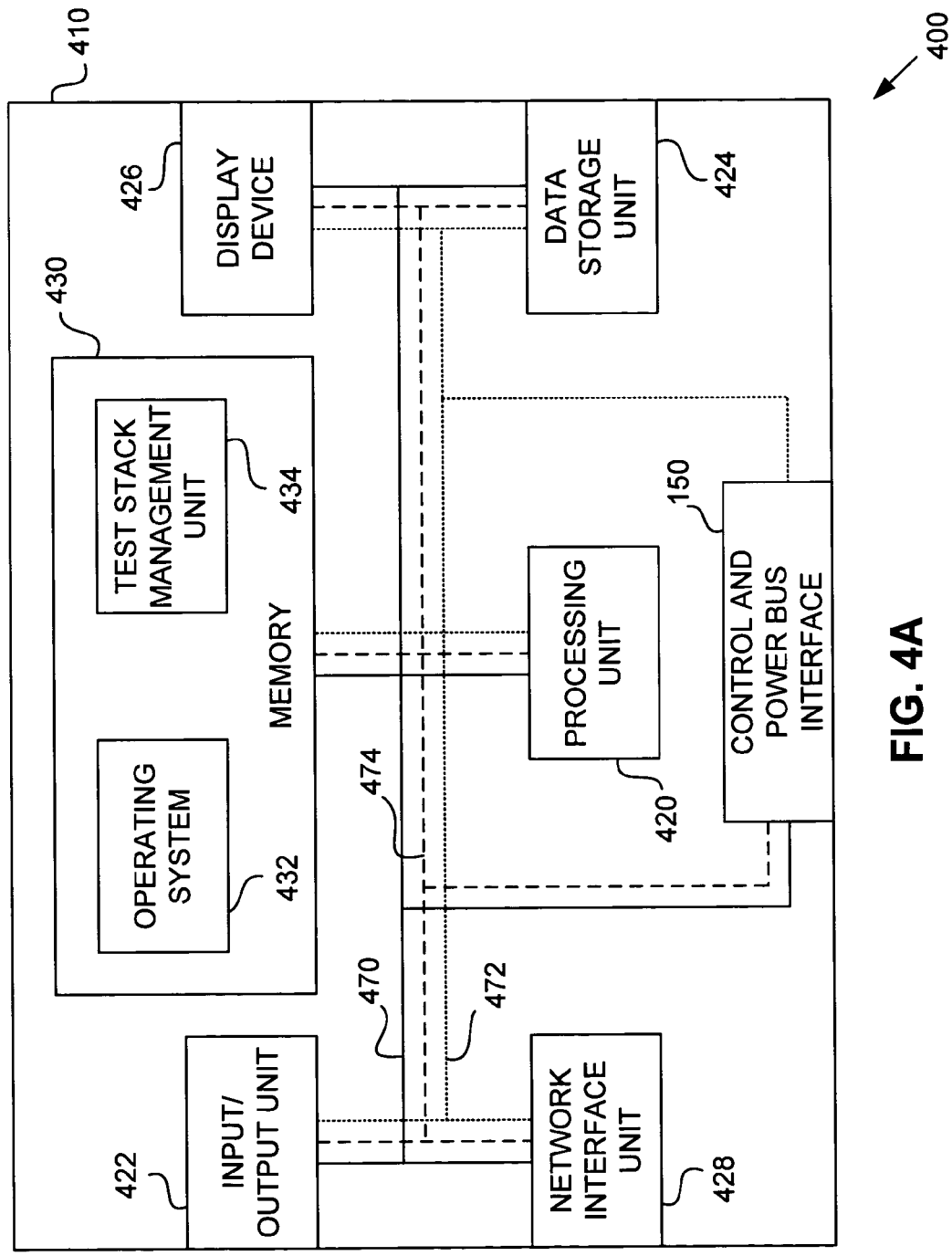
FIG. 4A is a block diagram of a control module according to an embodiment of the invention.

FIG. 4A is a block diagram of a control module 400 according to an embodiment of the invention. Relative to other Figures described herein, like reference numbers in FIG. 4A may indicate like, analogous, and/or essentially analogous elements. In one embodiment, the control module 400 comprises a case 410 that carries, contains, and/or incorporates a computer having a processing unit 420, an I/O unit 422, a data storage unit 424, a display device 426, a network interface unit 428, a memory 430, and a control and power bus interface 150. Each element of the computer may be coupled to an internal control bus 470, an internal power bus 472, and an optional high-speed data bus 474.

The control module's case 410 may comprise materials, structures, and/or features that are identical, analogous, and/or essentially analogous to those described above relative to the test module's case 110. The processing unit 420 may comprise a microprocessor, and the I/O unit 422 may comprise one or more input devices such as a keyboard and/or a mouse, touch pad, or other pointing device. The I/O unit 422 may further include a set of interfaces and/or ports, for example, a parallel interface, a serial interface, a USB interface, an IEEE 1394 interface, a PCMCIA interface, and/or one or more other types of communication interfaces, including those that may be included in the communication unit 120. The data storage unit 424 may comprise a disk drive and/or other type of data storage device, and the display device 426 may comprise a flat panel device such as a Liquid Crystal Display (LCD). The network interface unit 428 may comprise one or more types of network interfaces and circuitry associated therewith for exchanging signals with a network 20. The network interface unit 428 may be, for example, an Ethernet interface.

The memory 430 may comprise one or more types or RAM, ROM, PROM, flash memory, and/or other storage elements in which program instructions and data may reside. An operating system 432 and test stack management unit 434 may reside within the memory 430. The operating system 432 may comprise program instructions for managing access to various hardware and/or software resources. In an exemplary embodiment, the operating system 432 comprises Microsoft Windows NT. In one embodiment, the test stack management unit 434 comprises program instructions that provide a Graphical User Interface (GUI) for managing or directing the operation of test modules 100 and/or delivering power thereto. The test stack management unit 434 may additionally or alternatively comprise program instructions directed toward analyzing and/or displaying test stack configuration information, test stack status information, and/or information received from test modules 100 (e.g., data signals and/or test results) and/or power modules 200.

In one embodiment, the control module's control and power bus interface 150 comprises a single control and power interface 152, in a manner identical, analogous, or essentially analogous to that shown above in FIG. 3C. In such an embodiment, the control module 400 may reside at a given end of a test stack 700, in which case test modules 100 and one or more power modules 200 may extend away from the end of the stack 700 at which the control module 400 resides. Coupling inserts 156 may couple the control module 400, the set of test modules 100, and the set of power modules 200 within the test stack 700, such that common control, high-speed data, and power buses extend throughout the test stack 700.

Figure 4B:
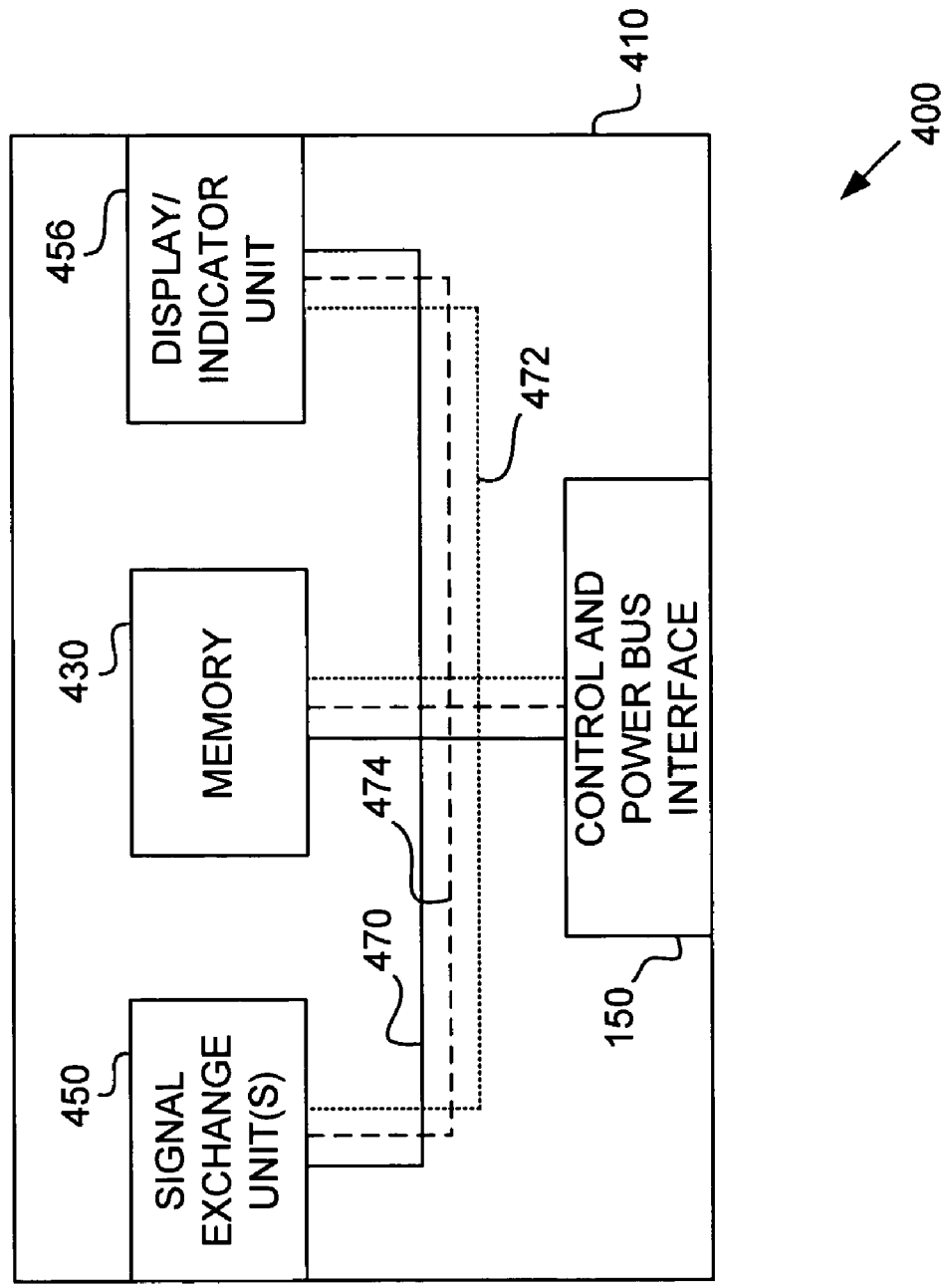
FIG. 4B is a block diagram of a control module according to another embodiment of the invention.

FIG. 4B is a block diagram of a control module 400 according to another embodiment of the invention. In one embodiment, the control module 400 comprises a case 410 that may reside upon or within a test stack 700, and which carries, contains, and/or incorporates a set of signal exchange units 450, a display/indicator unit 456, a memory 430, and a control and power bus interface 150. An internal control bus 470, an internal power bus 472, and a high-speed data bus 474 may couple each element within the control module 400.

Any given signal exchange unit 450 may comprise a communication device configured to exchange or transfer signals between a laptop or desktop computer system 500, 600, the display/indicator unit 456, memory 430, and/or the control and power bus interface 150. Communication between a signal exchange unit 450 and a laptop or desktop computer 500, 600 may be wire based, wireless, and/or optical in nature. In an exemplary embodiment, the signal exchange unit 450 comprises an RF transceiver coupled to a modulation state machine and the memory 430. Those skilled in the art will understand that a signal exchange unit 450 may exist in various forms in accordance with particular embodiment details.

The display/indicator unit 456 may comprise one or more devices capable of providing a visual indication of control module, controller, and/or test stack status and/or function. The display/indicator unit 456 may include, for example, an LCD display and/or a set of Light Emitting Diodes (LEDs). The memory 430 may comprise one or more types of RAM, ROM, PROM, flash memory, and/or other storage elements such as buffers, registers, and the like.

The control and power bus interface 150 within the control module 400 shown in FIG. 4B may include a first and a second control and power interface 152, 154 in a manner identical, analogous, or essentially analogous to that shown in FIG. 3B. In such an embodiment, the control module 400 may reside in essentially any position within a test stack 700. Alternatively, the control and power bus interface 150 within the control module 400 of FIG. 4B may include a single control and power interface 152 in a manner identical, analogous, or essentially analogous to that shown in FIG. 3C. Such a control module 400 may reside at one end of a test stack 700.

In an alternate embodiment, a controller 300 comprising a laptop or desktop computer 500, 600 may be configured to exchange signals with a test module's communication unit 120, for example, through a USB or other type of interface. In such an embodiment, a control module 400 may not be required.

In still another embodiment, a controller 300 may be configured with the application user interface therein, such as in the control module 400, so that the application user interface can run on a laptop computer 500 or desktop computer or workstation 600. This enables the control module to operate with a power source, such as a power module 200, but without the test module, using network testing software resident on the controller. A regular notebook PC can be configured in this fashion, for example, for use with the controller in field operations. Alternatively, the control module's input/output unit 422 and display device 426 may directly supply the user interface for operating the network testing software on the control module 400 without an external computer.

Exemplary Network Test Platforms

As previously indicated, the network test architecture 10 of the present invention may serve as a foundation for a variety of network test platforms. Any given network test platform may be designed for particular types of network test environments. Test modules 100 designed in accordance with the present invention may operate or function without modification across any or essentially any network test platform. Any given test module 100 within any or essentially any network test platform may be readily upgraded or replaced to accommodate technological evolution, while preserving network test platform structural characteristics. In the following descriptions of exemplary network test platforms, reference numbers matching those in previously described Figures may indicate like, analogous, or essentially analogous elements.

Figure 5A:
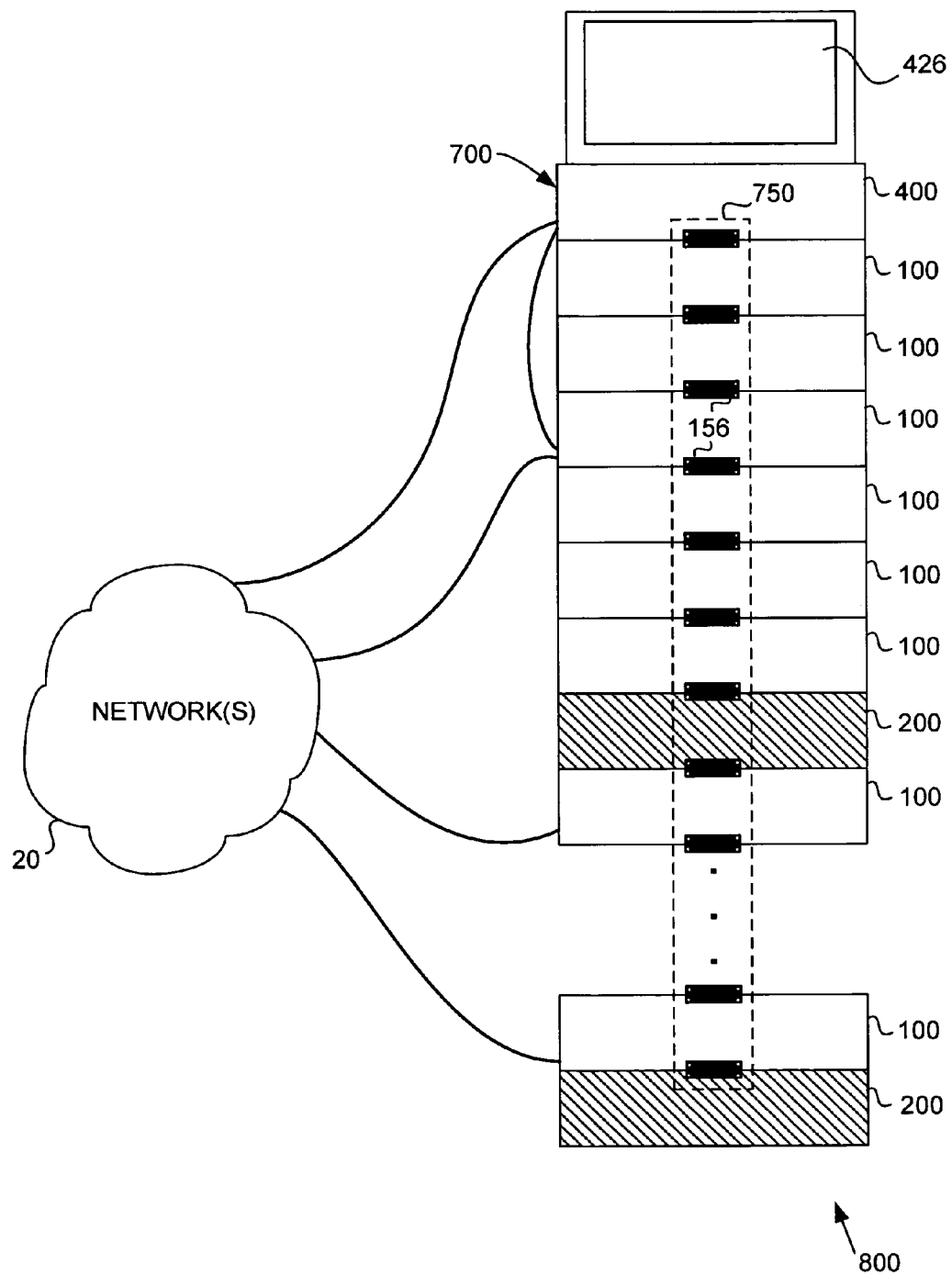
FIG. 5A is an illustration of a first exemplary network test platform according to an embodiment of the invention.

FIG. 5A is an illustration of a first network test platform 800 according to an embodiment of the invention. In one embodiment, the first network test platform 800 comprises a test stack 700 that includes a control module 400 of the type shown in FIG. 4A, at least one test module 100, and at least one power module 200. The number of power modules 200 present in the first network test platform 800 may depend upon the number of test modules 100 present, as previously described. The control module 400, each test module 100, and each power module 200 may have their control and power interfaces 152, 154 coupled together with a set of coupling inserts 156. As a result, a common control, data, and power bus 750 may run or extend throughout the test stack 700. Two or more test modules 100 within the test stack 700 may additionally be coupled and/or configured to communicate through their communication units 120. Such couplings between test modules 100 may form or establish one or more portions of a test module network. One or more test modules 100 may be coupled to one or more networks 20, through one or more separate and/or shared lines or links. Depending upon the number of test modules 100 included or incorporated therein, the first network test platform 800 may be well suited to in-field, bench test, and/or laboratory or research network test environments.

Figure 5B:
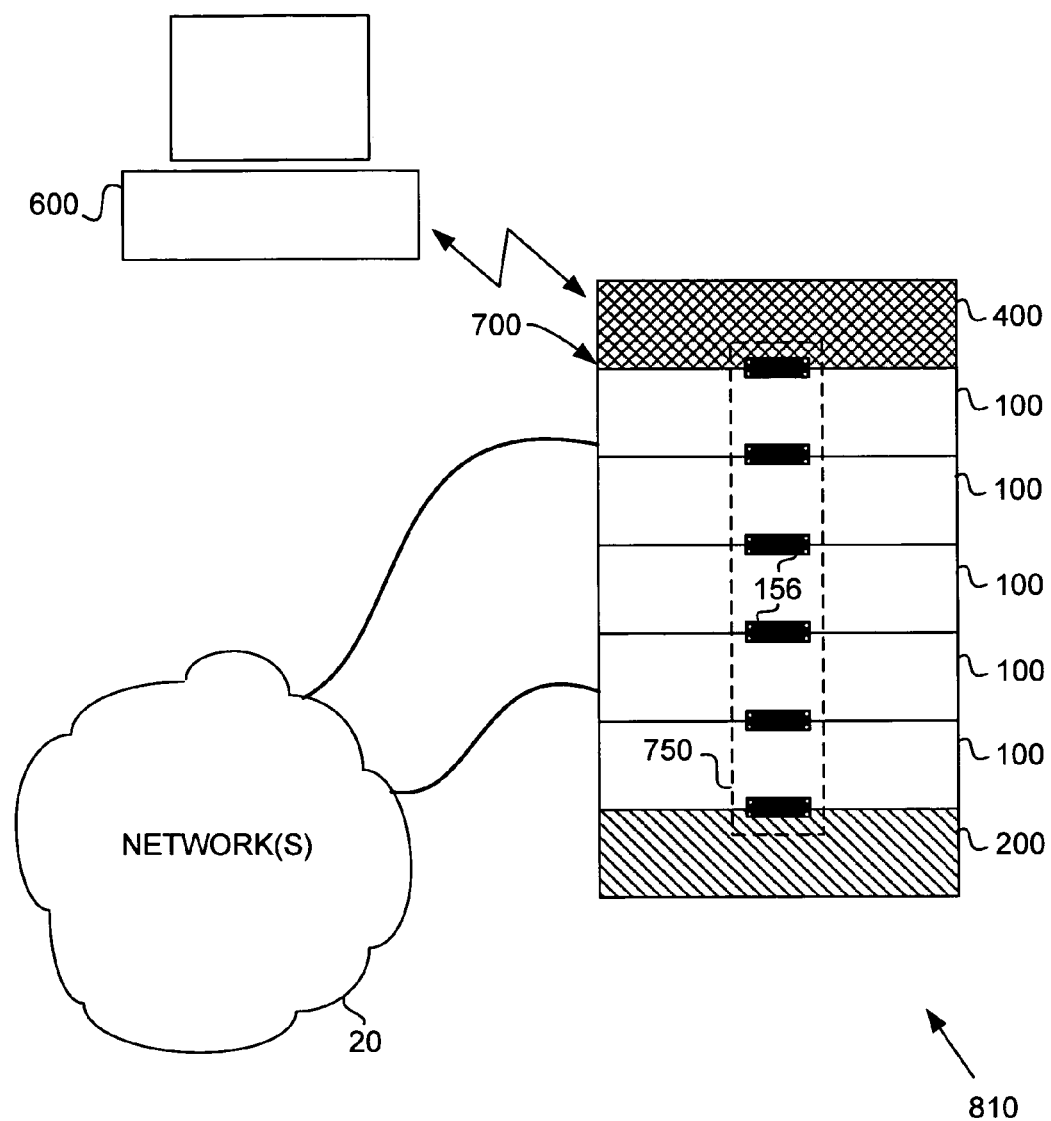
FIG. 5B is an illustration of a second exemplary network test platform according to an embodiment of the invention.

FIG. 5B is an illustration of a second network test platform 810 according to an embodiment of the invention. The second network test platform 810 may comprise a laptop or desktop computer 600 configured to communicate with a test stack 700 having a control module 400 of the type shown in FIG. 4B, at least one test module 100, and at least one power module 200. As with the first network test platform 800, the number of power modules 200 in the second network test platform 810 may depend upon the number of test modules 100 present. The control module 400, each test module 100, and each power module 200 may have their control and power interfaces 152, 154 coupled via a set of coupling inserts 156, thereby creating, defining, and/or establishing a common control, data, and power bus 750 that may run or extend throughout the test stack 700. Depending upon network test requirements, two or more test modules 100 within the test stack 700 may also be coupled and/or configured to communicate through their communication units 120. One or more test modules 100 may be coupled to networks 20 through one or more separate and/or shared lines or links. The second network test platform 810 may be well suited to in-field, bench test, and/or laboratory or research network test environments, depending upon the number of test modules 100 included or incorporated therein.

Figure 5C:
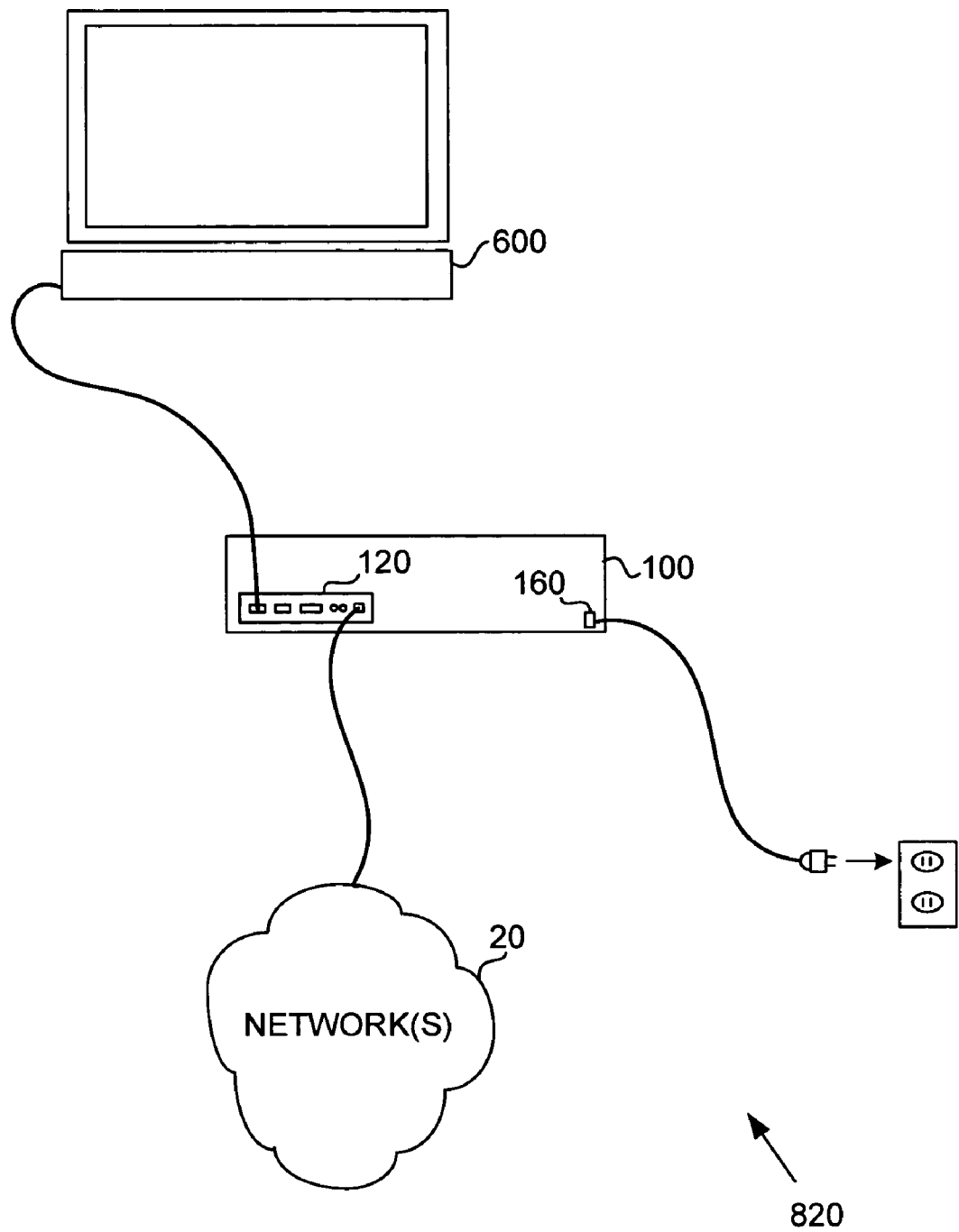
FIG. 5C is an illustration of a third exemplary network test platform according to an embodiment of the invention.

FIG. 5C is an illustration of a third network test platform 820 according to an embodiment of the invention. In one embodiment, the third network test platform 820 comprises a laptop or desktop computer 600 configured to communicate with a test module 100, where the test module 100 may be configured to receive power through its adjunct power interface 160. The adjunct power interface 160 may comprise, for example, an A/C adapter port and circuitry associated therewith. The laptop or desktop computer 600 may be coupled to the test module's communication unit 120, and the test module 100 may be coupled to networks 20. The third network test platform 820 may also be well suited to in-field, bench test, and/or laboratory or research network test environments.

Figure 5D:
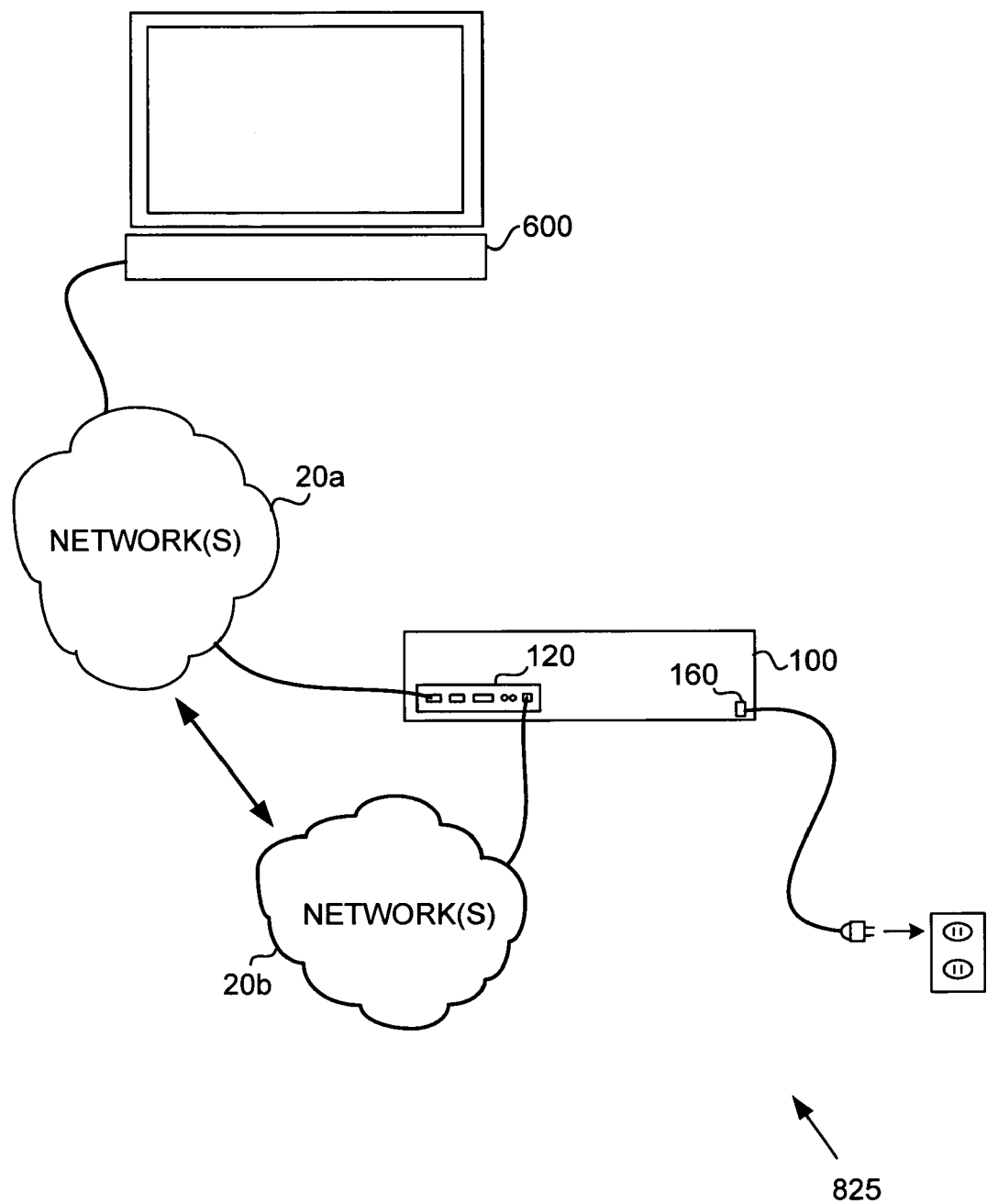
FIG. 5D is an illustration of a fourth exemplary network test platform according to an embodiment of the invention.

FIG. 5D is an illustration of a fourth network test platform 825 according to an embodiment of the invention. Relative to FIG. 5C, like reference numbers indicate like, analogous, and/or essentially analogous elements. The fourth network test platform 825 may be organized in an identical or essentially identical manner to that of the third network test platform 820. However, the laptop or desktop computer 600 may be coupled to a first network 20a, which is coupled to the test module's communication unit 120. The first network 20a may comprise or include the Internet. The test module 100 may be further coupled to a second network 20b to facilitate physical network, network signaling and/or protocol, network device, and/or network service testing, characterization, analysis, diagnosis, troubleshooting, verification, supervision, monitoring, and/or simulation. The first and second networks 20a, 20b may be essentially independent, or configured to communicate with each other.

Figure 5E:
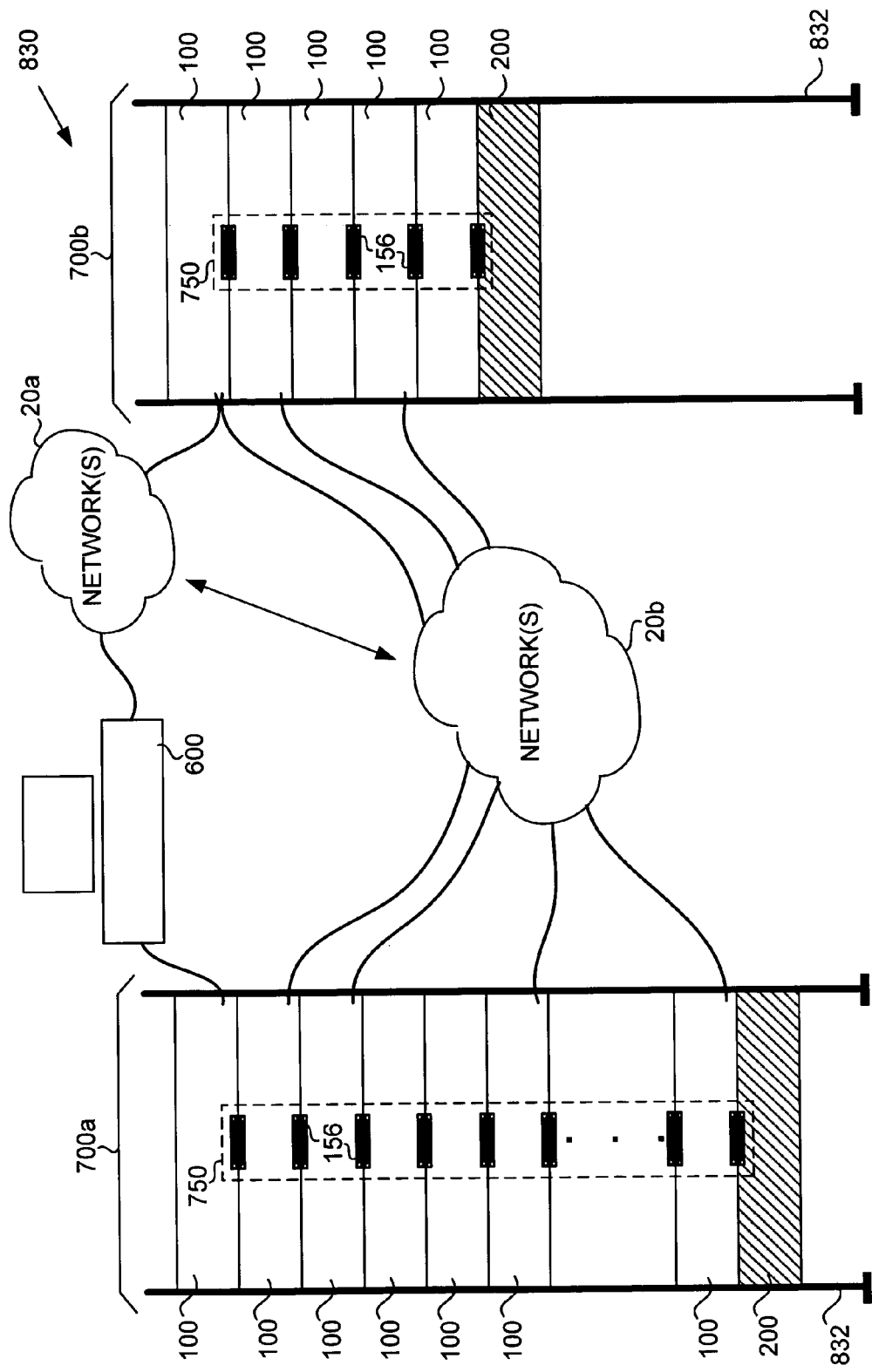
FIG. 5E is an illustration of a fifth exemplary network test platform according to an embodiment of the invention.

FIG. 5E is an illustration of a fifth network test platform 830 according to an embodiment of the invention. In one embodiment, the fifth network test platform 830 comprises a laptop or desktop computer 600 coupled or configured to communicate with one or more test stacks 700a, 700b. The laptop or desktop computer 600 may maintain a direct or local coupling to a first test stack 700a, and an indirect or remote coupling to a second test stack 700b. The remote coupling may involve a first network 20a, which may comprise or include the Internet.

Each test stack 700a, 700b may include a set of test modules 100 and at least one power module 200 mounted in or upon a test rack 832. A set of coupling inserts 156 may couple the first and/or second control, data, and power interfaces 152, 154 of adjacent test modules 100 and power modules 200 within each test stack 700a, 700b, thereby forming or establishing a common control and power bus 750 in each test stack 700a, 700b. Two or more test modules 100 within any given test stack 700a, 700b may also be coupled and/or configured to communicate with each other through their communication units 120. One or more test modules 100 in each test stack 700a, 700b may be coupled to a second network 20b to facilitate physical network, network signaling and/or protocol, network device, and/or network service testing, characterization, analysis, diagnosis, troubleshooting, verification, supervision, monitoring, and/or simulation. The first and second networks 20a, 20b may be essentially independent, or may be configured to communicate with each other. The fifth network test platform 830 may be well suited to manufacturing, central office, and/or other network test environments.

User Interface

A test stack management unit 434 (FIG. 4A) executing upon a controller 300 may generate, provide, and/or operate in conjunction with a GUI that facilitates graphical and/or visual management of test stack operation. The GUI may direct the operation of individual test modules 100, groups of test modules 100, and/or power modules 200 to facilitate physical network, network signaling and/or protocol, network device, and/or network service testing, characterization, analysis, diagnosis, troubleshooting, verification, supervision, monitoring, and/or simulation. The GUI may additionally facilitate graphical or visual display of configuration parameters, test results, data, and/or other information.

Figure 6:
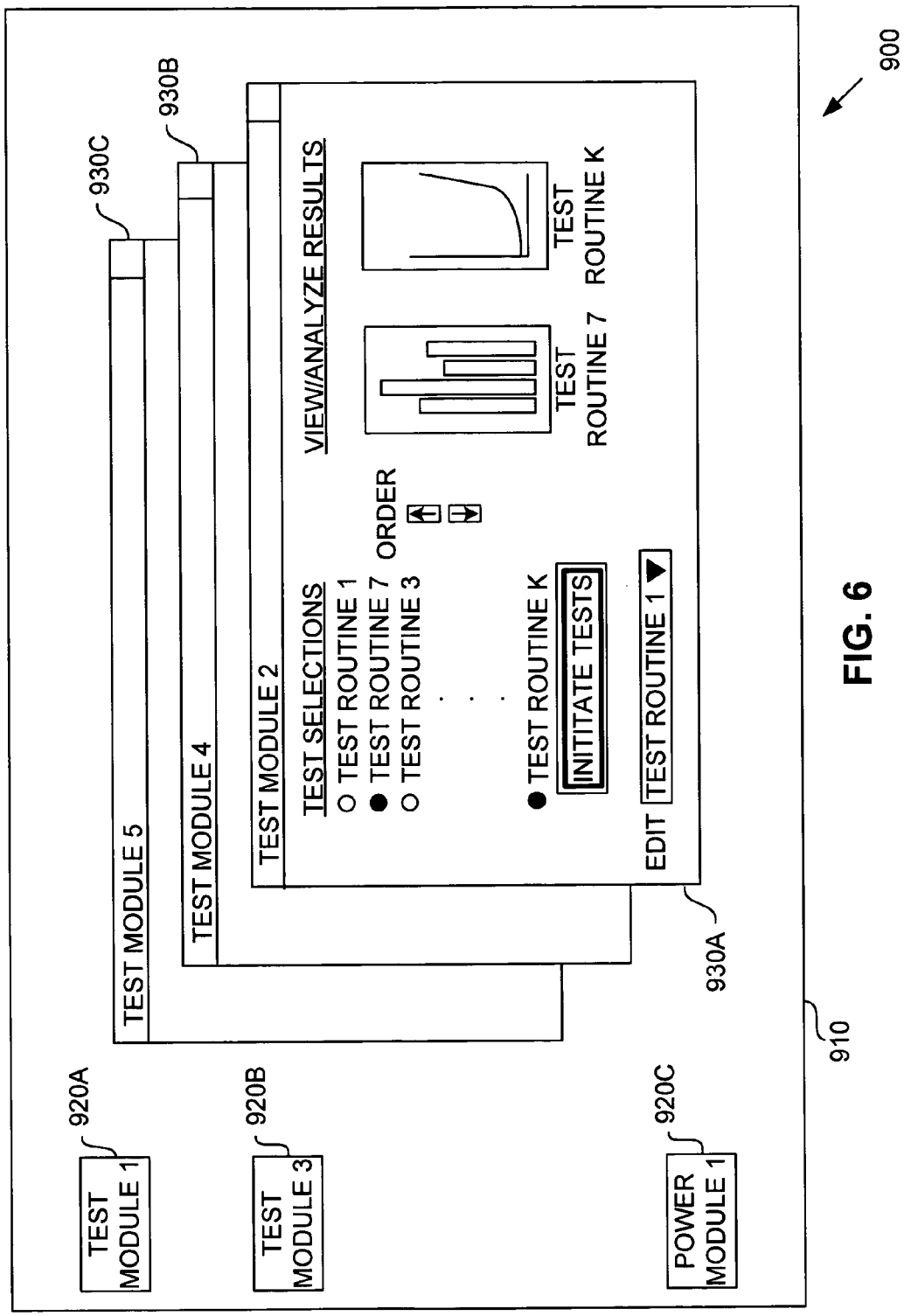
FIG. 6 is an illustration of an exemplary Graphical User Interface organization for managing test stack operation according to an embodiment of the invention.

FIG. 6 is an illustration of an exemplary GUI 900 for managing test stack operation according to an embodiment of the invention. In one embodiment, the GUI 900 comprises an application workspace and/or a main window 910 in which a set of icons 920a, 920b, 920c and/or a set of module windows 930a, 930b, 930c may be displayed. Each icon 920a, 920b, 920c may graphically or visually represent a test module 100 or a power module 200. Any given module window 930a, 930b, 930c may facilitate a) the display of information corresponding to a set of test modules 100 and/or power modules 200; and/or b) the control of one or more test modules 100 and/or power modules 200. Module windows 930a, 930b, 930c may be tiled and/or cascaded within the main window 910 in a manner understood by those skilled in the art.

A GUI 900 generated in accordance with the present invention may provide a menu bar, a variety of menus, and/or one or more buttons, list boxes, text boxes, selection and/or ordering controls, and/or various other types of GUI widgets or controls to facilitate test stack management operations in response to user input. Selection of particular graphical elements within a given module window 930a, 930b, 930c may result in the generation of additional or child windows that display information relevant to a test module 100, a power module 200, one or more test routines, test stack configuration and/or status, test operations, and/or test results.

It has been discovered that the present invention provides numerous advantages. For example, it is not limited by the sizes of the individual external cases 110, 210, and 410, but instead can be conveniently scaled to whatever performance capabilities may be required in a given situation, by the selection and coupling of the appropriate types and numbers of individual modules. By means of the power interfaces 152 and 154, and the coupling insert 156, the internal communication and data buses of each module become external from a system-wide perspective, thus freeing the network test architecture buses of the present invention from the physical limitations of the individual components. The individual MAC addresses 132 for each test module 100 and 242 of the power modules 200 enable virtually unlimited scalability and system design flexibility by eliminating possible conflict over addressing of each unique module. This further facilitates the power conservation capabilities of the present invention by enabling the controller to command each module individually to power on or off as needed, thereby keeping real-time power consumption to the very minimum required at any given moment. This is an important advantage for field applications where power sources and power availability may be limited.

While the invention has been described in conjunction with a specific best mode, it is to be understood that many alternatives, modifications, and variations will be apparent to those skilled in the art in light of the aforegoing description. For example, a test module 100 may include or incorporate alternate or additional control and power interfaces upon sides other than a first and a second side 112, 114. Test modules may also incorporate their own internal power sources, such as batteries, and may power other modules if needed by means of the power bus 172. As another example, control signaling in one or more portions of a test stack 700 may be effectuated by an RF communication device within particular test modules 100, power modules 200, and/or controller 300.

Accordingly, the present invention is intended to embrace all such alternatives, modifications, and variations which fall within the spirit and scope of the included claims. All matters hither-to-fore set forth herein or shown in the accompanying drawings are to be interpreted in an illustrative and non-limiting sense.

What is claimed is:

1. A network test architecture comprising:
   a plurality of modules for performing a plurality of functions, each of the plurality of modules having a unique identifier;
   an additional module for performing an additional function, the additional module having an additional unique identifier;
   a control bus connected among the plurality of modules;
   a data bus connected among the plurality of modules;
   a power bus connected among the plurality of modules; and
   a controller for controlling operation, data transmission, or powering the additional module respectively through the control bus, the data bus, or the power bus using the unique identifier and the additional unique identifier upon connection of the control bus, the data bus, or the power bus to the additional module.

2. The network test architecture of claim 1:
   wherein the plurality of modules further comprises at least one of:
      a set of power modules; and
      a set of test modules, each test module associated with at least one type of network test operation, at least one test module physically positionable relative to at least one power module;
   and further comprising:

a set of disconnectable coupling members, each disconnectable coupling member simultaneously establishing the connection of the control bus, the data bus, and the power bus between one from the group of a test module, a power module, and the controller, and one from the group of a test module, a power module, and the controller.

3. The network test architecture of claim 2, wherein the number of test modules within the set of test modules may be scaled.

4. The network test architecture of claim 2, wherein each test module, each power module, and the controller includes a common bus interface structured to accommodate a portion of a disconnectable coupling member.

5. The network architecture of claim 4, wherein the common bus interface of each test module, the common bus interface of each power module, the common bus interface of the controller, and the set of disconnectable coupling members comprise a common bus that extends to the controller, to the set of test modules, and to the set of power modules.

6. The network test architecture of claim 5, wherein the common bus carries one from the group of control signals, data signals, power signals, both control and data signals, both control and power signals, both data and power signals, and control, data, and power signals.

7. The network test architecture of claim 2, wherein the controller comprises:
a computer system;
a control module; and
a signal transfer unit coupled to the control module, the signal transfer unit configured to exchange signals at least between the computer system and the control module.

8. The network test architecture of claim 7, wherein the signal transfer unit comprises a communication device selected from the group of wired communication devices and wireless communication devices.

9. The network test architecture of claim 2, wherein each test module comprises a case structured to physically accommodate one from the group of a test module, a power module, and the controller.

10. The network test architecture of claim 2, wherein each test module, each power module, and the controller includes a case structured to accommodate physical connection to another one of the cases selected from the group of the test module cases and power module cases.

11. The network test architecture of claim 2, wherein the number of test modules within the set of test modules is scalable in accordance with a set of requirements associated with a network test environment.

12. The network test architecture of claim 2, wherein each test module within the set of test modules and the controller can be configured to operate independently of the set of power modules and the set of coupling members.

13. The network test architecture of claim 2, wherein a test module comprises:

a test element unit comprising one from the group of hardware, software, and programmable media; and
an adjunct power interface coupled to the test element unit.

14. The network test architecture of claim 2, further comprising a set of networks coupled to at least one test module within the set of test modules.

15. The network test architecture of claim 2, further comprising:
a first network coupled to the controller; and
a second network coupled to at least one test module within the set of test modules.

16. The network test architecture of claim 15, wherein the first network couples the controller to a first test module within the set of test modules.

17. The network test architecture of claim 1 further comprising a set of disconnectable coupling members, each disconnectable coupling member simultaneously establishing the connection of the control bus, the data bus, and the power bus between one from the group of the plurality of modules, the additional module, and the controller, and one from the group of the plurality of modules, the additional module, and the controller.

18. The network test architecture of claim 1 wherein the controller can directly address a particular module by means of its unique identifier to instruct that module to power off to save power, and to instruct it to power on when desired, to enable power consumption to be selectively controlled.

19. A network test architecture comprising:
at least one module for performing a plurality of functions, the module having a unique identifier;
an additional module for performing an additional function, the additional module having an additional unique identifier;
a control bus connected among the modules;
a data bus connected among the modules;
a power bus connected among the modules;
a controller for controlling operation, data transmission, or powering of the modules through the control bus, the data bus, or the power bus using the unique identifier and the additional unique identifier upon connection of the control bus, the data bus, or the power bus to the additional module; and
the controller directly addressing a particular module by means of its unique identifier to instruct that module to power off to save power, and to instruct it to power on when desired, to enable power consumption to be selectively controlled.

20. The network test architecture of claim 19 further comprising a set of disconnectable coupling members, each disconnectable coupling member simultaneously establishing the connection of the control bus, the data bus, and the power bus between at least one module, the additional module, and the controller.

* * * * *